(12) United States Patent  (10) Patent No.: US 9,061,649 B2
Thielhorn  (45) Date of Patent: Jun. 23, 2015

(54) MOULDED TRIM COMPONENT FOR COVERING AN AIRBAG IN A MOTOR VEHICLE

(75) Inventor: Peter Thielhorn, Muelheim/Ruhr (DE)

(73) Assignee: Johnson Controls Technology Company, Holland, MI (US)

( * ) Notice: Subject to any disclaimer, the term of this patent is extended or adjusted under 35 U.S.C. 154(b) by 381 days.

(21) Appl. No.: 13/498,753

(22) PCT Filed: Sep. 23, 2010

(86) PCT No.: PCT/EP2010/005814
§ 371 (c)(1),
(2), (4) Date: Jun. 4, 2012

(87) PCT Pub. No.: WO2011/038856
PCT Pub. Date: Apr. 7, 2011

(65) Prior Publication Data
US 2012/0237712 A1   Sep. 20, 2012

(30) Foreign Application Priority Data
Sep. 30, 2009  (DE) .......................... 10 2009 043 498

(51) Int. Cl.
*B65D 65/28* (2006.01)
*B60R 21/2165* (2011.01)
*B32B 7/06* (2006.01)
(52) U.S. Cl.
CPC ........... *B60R 21/2165* (2013.01); *Y10T 428/15* (2015.01); *B32B 7/06* (2013.01)
(58) Field of Classification Search
CPC ...... Y10T 428/15; B60R 21/2165; B32B 7/06

USPC ........... 428/43, 44, 131, 156; 280/727, 728.3, 280/752
See application file for complete search history.

(56) References Cited

U.S. PATENT DOCUMENTS

| 5,308,143 | A |   | 5/1994 | Cheng et al. |
| 7,810,836 | B2 | * | 10/2010 | Muller et al. ............... 280/728.2 |
| 2007/0018435 | A1 | * | 1/2007 | Muller et al. ............... 280/728.3 |

FOREIGN PATENT DOCUMENTS

| CN | 1647723 A | 8/2005 |
| CN | 201101324 Y | 8/2008 |
| CN | 101426406 A | 5/2009 |
| DE | 102 41 715 A1 | 3/2004 |
| DE | 10 2006 027082 A1 | 12/2007 |
| DE | 102006027082 A1 * | 12/2007 |
| DE | 10 2006 055861 B3 | 2/2008 |
| EP | 1 380 477 A1 | 1/2004 |
| EP | 1 655 184 A1 | 5/2006 |
| JP | 2007-159709 A | 6/2007 |

OTHER PUBLICATIONS

International Search Report for application No. PCT/EP2010/005814 dated Jul. 19, 2011.

* cited by examiner

*Primary Examiner* — Brent O'Hern
(74) *Attorney, Agent, or Firm* — Fletcher Yoder, P.C.

(57) ABSTRACT

A molded trim component for covering an airbag in a motor vehicle comprises a support, an intermediate layer, and a decorative layer. The decorative layer is adhesively bonded to the surface of the intermediate layer, at least in the region of a tear-open line of the intermediate layer or at least in the vicinity of the tear-open line.

19 Claims, 1 Drawing Sheet

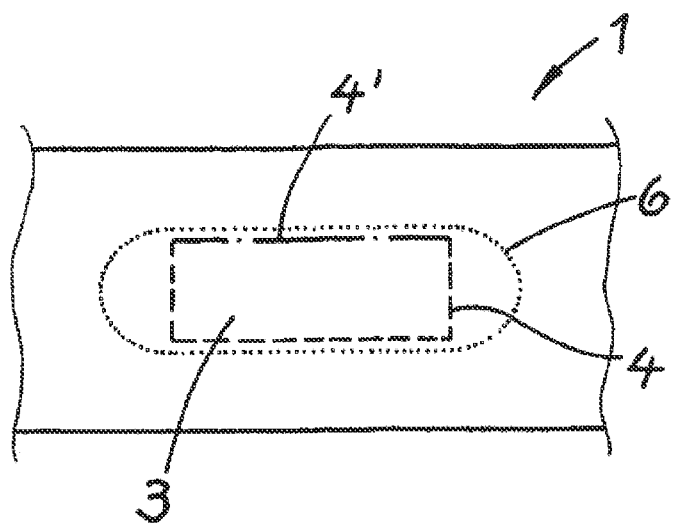
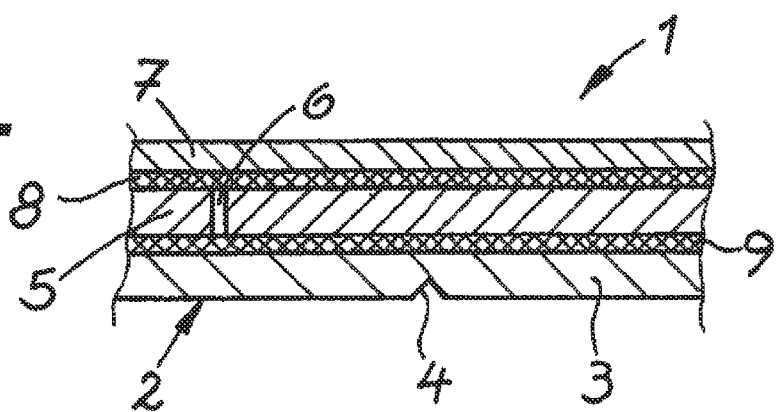
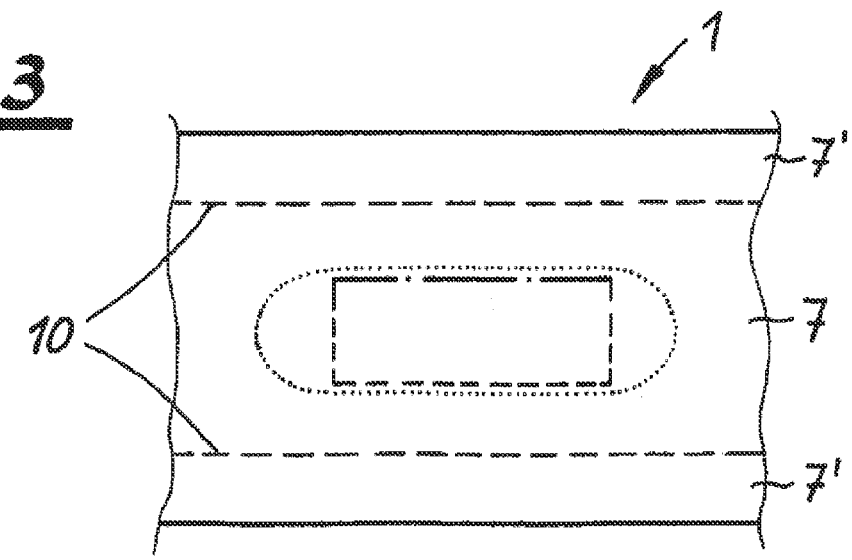

MOULDED TRIM COMPONENT FOR COVERING AN AIRBAG IN A MOTOR VEHICLE

CROSS REFERENCE TO RELATED APPLICATIONS

This application claims priority from and the benefit of PCT Application No. PCT/EP2010/005814, filed on Sep. 23, 2010 and German Patent DE 10 2009 043 498.4, filed on Sep. 30, 2009, which are herein incorporated by reference.

BACKGROUND

The invention relates to a molded trim component for covering an airbag in a motor vehicle, having at least a support which is weakened along an opening line adjoining an opening cover, an intermediate layer arranged on the support, said intermediate layer being weakened along a tear-open line assigned to the opening line of the support, and a decorative layer made of leather arranged on the intermediate layer, said decorative layer having no local weakening in the region of the tear-open line in the intermediate layer.

The support is for example a plastics molded component which can be produced for example as an injection-molded component or the like. The intermediate layer fastened, for example adhesively bonded, to the support may be in particular a knitted fabric, specifically a knitted spacer fabric. Within the context of the invention, weakening means for example a weakening in the thickness or a local thickness reduction as in the case of a notch or else a perforation or the like. The decorative layer made of leather is adhesively bonded as a rule to the knitted spacer fabric. A molded trim component formed in this way is used for example as an interior covering in a vehicle, for example as a dashboard covering, door inner trim or the like. In order that the airbag arranged in a firing channel behind the molded trim component, specifically behind the opening cover of the molded trim component, can deploy reliably, the support is weakened along the opening line, forming the opening cover. The opening cover is formed in a substantially rectangular manner, with the weakening breaking open as a rule on three sides when the airbag is deployed, so that the opening cover flaps open in the manner of a hinge. The opening cover can in this case also consist of a plurality of covers or cover sections, which flap open individually in the manner of a hinge. During opening, the intermediate layer, for example the knitted spacer fabric, likewise tears open along the tear-open line.

In order to avoid the opening cover or airbag cover being visible from the vehicle interior, the entire molded trim component is provided as a rule with a decorative layer made for example of leather, without seams or the like being visible in the region of the opening cover. In order nevertheless to ensure defined tearing open of the airbag covering when the airbag is deployed, in the past the decorative layer made of leather was provided on the rear with a weakening line, which is aligned substantially with the tear-open line in the intermediate layer. However, the production of such airbag coverings is complicated. Moreover, the weakenings in the rear of the leather layer are disadvantageous, since, in particular in the course of aging, they can become apparent on the surface the weakening line in the rear of the leather layer and are then visible from the vehicle interior.

For this reason, it has already been proposed to dispense with a weakening in the rear of the leather (cf. DE 10 2006 055 861 B3). However, in order to ensure defined opening of the airbag in the known embodiment, it was proposed to omit the adhesive connection between the leather layer and the intermediate layer (knitted spacer fabric) within a strip extending along the tear-open line. What is disadvantageous with this embodiment is the fact that the application of adhesive has to be carried out in a defined and controlled manner and that in particular exact positioning of the individual layers in relation to one another has to be ensured. As a result, the overall production becomes more complicated.

DE 10 2006 027 082 A1, too, discloses a molded trim component of the type described at the beginning, in which the decorative layer is intended to be unweakened in the region of the opening line in the support part or in the intermediate layer.

SUMMARY

The invention is based on the object of creating a molded trim component for covering an airbag in a motor vehicle, of the type described at the beginning, said molded trim component satisfying high esthetic requirements and being producible in an economical manner, but nevertheless ensuring reliable deployment of an airbag.

In order to achieve this object, the invention teaches, in the case of a generic molded trim component of the type described at the beginning, that the decorative layer made of leather is adhesively bonded all over the surface of the intermediate layer at least in the region of the tear-open line in the intermediate layer or at least in the vicinity of the tear-open line. The tear-open line in the intermediate layer extends in this case—with respect to the opening cover—preferably outside the opening line in the support. Particularly preferably, parts or sections of the tear-open line in the intermediate layer in this case do not extend parallel to the opening line in the support. Since the opening cover of conventional airbag coverings are formed as a rule in a rectangular manner in plan view, the invention proposes, in a particularly preferred development, that the tear-open line in the intermediate layer deviates from the rectangular form. It can be formed for example in an elliptical or oval manner in plan view. Preferably, only regions or sections of the tear-open line are formed in a curved manner. Thus, the tear-open line can extend for example along two opposing parallel side lines in the cover in a manner parallel to the side lines in the cover and extend in an arcuate manner in the remaining regions, that is to say in the region of the two other opposite side lines in the cover, thereby resulting overall in an approximately oval form in plan view. In any case, the tear-open line in the intermediate layer does not entirely follow the opening line in the support.

The invention proceeds in this case from the surprising finding that reliable and defined deployment of the airbag with a locally unweakened leather layer (i.e. one without a separate weakening line) can be ensured even when a defined gap in the adhesive connection has been dispensed with and consequently adhesive bonding takes place all over the surface. This has the advantage for manufacturing that care does not have to be taken to provide defined gaps during the application of adhesive. Furthermore, it is not necessary to position the leather layer precisely. Since a weakening in the leather layer has been dispensed with, the trim according to the invention satisfies even high esthetic demands in modern vehicles. Surprisingly, the opening function of the airbag is not impaired. It is sufficient for both the support part and the intermediate layer, for example the knitted fabric to be weakened or perforated in a manner known per se. The weakening or perforation in the knitted fabric defines the tear-open line also in the leather layer arranged above, without the leather layer itself having to be weakened and without a gap in the adhesive connection having to be dispensed with. Particularly preferably, this can be ensured—as already described—in that the course of the tear-open line in the intermediate layer deviates quite deliberately from the course of the opening line in the support and consequently does not follow the opening line in the support.

In a particularly preferred development, the invention proposes that the decorative layer made of leather, which is fastened, for example adhesively bonded, to the intermediate layer, has a thickness of 0.4 mm to 0.8 mm, preferably of 0.5 mm to 0.7 mm, for example about 0.6 mm. Consequently, work is carried out using a relatively thin leather which can tear open in a defined manner even without a local weakening. Such a leather layer having a relatively small thickness can be produced economically in a particularly preferred manner in that the initially produced and finished leather is split during the subsequent processing, preferably dry split, specifically to the desired thickness.

In order to ensure particularly reliable tearing open of the leather layer as a result of the tearing open of the tear-open line in the knitted fabric, it is expedient for a leather having a relatively low elongation at break to be used. Therefore, the invention proposes preferably that the leather, for example the leather split to the desired thickness, has an elongation at break of at most 40%, particularly preferably at most 35%. An elongation at break of 25% to 40%, particularly preferably 30% to 35%, is expedient.

It is further expedient for use to be made of leather which has a lower tear propagation strength than the types of leather usually used hitherto in practice for airbag coverings. Thus, the invention proposes that the leather or the decorative layer made of leather has a tear propagation strength of less than 12 N, preferably less than 10 N. Tear propagation strength means in this case at least the tear propagation strength in the longitudinal or transverse direction, preferably both in the longitudinal and in the transverse direction. Preferably, the tear propagation strength of the leather dry split to the thickness specified above is meant.

A leather having such properties ensures defined tearing open, brought about by the defined tearing open of the knitted fabric, even without local weakening and with all-over adhesive bonding.

In a preferred development, it is provided that a chrome-free tanned leather is used for the decorative layer. In principle, it is possible for the (tanned) leather to be dried in a known manner during production, for example by way of toggle drying. In the process, the leather is stretched out on a frame with the aid of toggles and is introduced into a dryer. However, particularly preferably, the invention proposes that the drying take place by way of vacuum drying. In this case, the leather is not stretched out on a frame by means of toggles but by way of negative pressure or vacuum. Tests have shown that the leather dried in this way can be used particularly well for the purpose mentioned.

As already described, all-over adhesive bonding of the leather to the intermediate layer, for example the knitted fabric, is provided within the context of the invention. All-over adhesive bonding means, within the context of the invention, all-over adhesive bonding in the vicinity of the tear-open line. Consequently, the adhesive connection is not omitted in the vicinity of the tear-open line. However, within the context of the invention, it is possible to provide gaps in the adhesive connection in other regions of the molded trim component. Thus, it is in principle possible to dispense with an adhesive connection in the region of the opening cover itself or in subregions of the opening cover. For manufacturing reasons, however, all-over adhesive bonding is to be preferred. Adhesive bonding of the intermediate layer to the support also takes place as a rule all over the surface.

Various adhesives can be used for the adhesive bonding. Preferably, the decorative layer made of leather is fastened to the intermediate layer by means of a reactivatable hot-melt adhesive. The intermediate layer, too, can be fastened to the support by means of a reactivatable hot-melt adhesive. In this case, it is possible to spray or roll the hot-melt adhesive onto the decorative layer, the intermediate layer and/or the support.

In principle, the invention comprises embodiments in which the entire molded trim component is covered with a unitary and consequently one-piece decorative layer made of leather. This one-piece decorative layer made of leather can then have the same thickness over its entire area. However, it is also possible, in particular in the case of large molded trim components, to provide the one-piece decorative layer made of leather with regions having different thicknesses. Thus, the leather can have a greater thickness of, for example, 1 mm or more in regions which are relatively distant from the airbag opening and to be split down to the above-described dimension only in the vicinity of the airbag covering or the opening cover. However, even in this embodiment, local weakenings or weakening lines (e.g. notches) in the leather along the tear-open line in the knitted fabric are dispensed with.

Optionally, it is possible to compose the decorative layer from a plurality of leather sections, it being possible for these leather sections to have different thicknesses. Thus, it is possible to provide a leather section having a lower thickness in the region of the opening cover and in the vicinity thereof, and to provide a leather section having a greater thickness in the remaining regions. The individual leather sections can be connected together, for example be sewn together via a seam. However, this seam does not form a tear-open line, but rather such seams are ornamental seams which are provided for esthetic reasons on the vehicle trim.

DRAWINGS

The invention is explained in more detail in the following text on the basis of a drawing which illustrates only one exemplary embodiment and in which:

FIG. 1 shows a simplified plan view of a molded trim component according to the invention, FIG. 2 shows a schematically simplified section through the object according to FIG. 1, and FIG. 3 shows a modified embodiment of the object according to FIG. 1.

DETAILED DESCRIPTION

The figures illustrate a molded trim component 1 for covering an airbag (not shown) in a motor vehicle. This molded trim component 1 consists in its basic structure of a support 2, an intermediate layer 5 and a decorative layer 7.

As a rule, the support 2 is formed as a molded plastics component, e.g. an injection-molded component. It may be a support 2 for a dashboard or some other interior covering. Behind the molded trim component 1, or behind the support 2, an airbag (not illustrated) is arranged in a firing channel (not illustrated).

It can first of all be seen from a comparison of FIGS. 1 and 2 that the support 2 is weakened along an opening line 4. This weakening or opening line 4 defines an opening cover 3 of the support. The opening cover 3 is in this case formed in a substantially rectangular manner in plan view. The weakening forming the opening line 4 is in this case provided on three side lines of this rectangle in the exemplary embodiment. The fourth side line 4' forms as it were an opening hinge, and so the cover 3 flaps open as it were when the airbag is deployed, in that the support 2 tears or breaks open along the opening line 4. The opening cover thus flaps open in a "window-like" manner. Modified embodiments, in which the opening cover consists of two sections that flap open in the manner of a "double window", are also possible in this case. Such an embodiment is not illustrated.

It can also be seen from a comparison of FIGS. 1 and 2 that the intermediate layer 5 fastened to the support 2 is weakened along a tear-open line 6. This tear-open line 6 can be formed for example as a perforation. The intermediate layer 5 itself is formed for example as a knitted spacer fabric. In this case, it is indicated that, although the tear-open line 6 in the intermediate layer 5 is "assigned" to the opening line 4 in the support 2, the tear-open line 6 is not aligned with the opening line 4. Rather, the tear-open line 6 in the intermediate layer 5 extends—in relation to the opening cover 3—outside the opening line 4 in the support 2. For example, as shown in FIG. 1, the tear-open line 6 is positioned outward of the opening line 4 from the opening cover 3. In particular, it is indicated in FIG. 1 that the tear-open line 6 in the intermediate layer 5 does not extend parallel to the opening line 4 in the support 2 over its entire length and consequently does not follow the opening line. While the opening line 4 in the opening cover 3 is formed substantially by a rectangle or by the or some of the sides of the rectangle, the tear-open line 6 in the intermediate layer 5 has a form that deviates from the rectangular form, specifically a "partially" oval or elliptical form. Thus, it can be seen in FIG. 1 that the tear-open line 6 in the intermediate layer 5 extends (substantially) parallel to the side lines 4, 4' of the cover 3 along the longitudinal sides of the cover 3. By contrast, in the region of the (short) transverse sides of the cover 3, the tear-open line 6 in the intermediate layer 5 extends in an arcuate manner and consequently not parallel to the opening line 4 in the support 2, and so the course of the tear-open line 6 that is discernible in FIG. 1 and can be called oval results overall.

According to the invention, a weakening in the leather layer 7 is dispensed with in the region of the tear-open line 6 in the intermediate layer 5. Consequently, a locally unweakened leather 7 is illustrated in FIG. 2. The decorative layer 7 made of leather is in this case adhesively bonded all over the surface of the intermediate layer 5, specifically by way of an adhesive layer 8. Consequently, a gap in the adhesive layer 8 in the region of the tear-open line is dispensed with. Otherwise, it can be seen that the knitted fabric 5 is fastened to the support 2 by means of an adhesive layer 9. Here, too, all-over adhesive bonding takes place.

The leather has for example a thickness of 0.6 mm in that it is dry split to this thickness. In this case, use is preferably made of a chrome-free tanned leather which is dried by way of vacuum drying. The leather used can have an elongation at break of for example 30 to 35% and a tear propagation strength of less than 10 N. The adhesive bonding is carried out in this case, for example, with a reactivatable hot-melt adhesive, which is for example sprayed or rolled on. In any case, defined tearing open of the leather layer 7 and consequently defined opening of the airbag are ensured within the context of the invention, without a weakening being provided in the leather in the region of the tear-open line 6 in the knitted fabric 5 and without an adhesive gap being provided in the region of the tear-open line 6.

FIG. 1 illustrates in this case an embodiment in which the entire support 2 is covered with a one-piece decorative layer 7 made of leather. The leather, or the decorative layer 7, has substantially the same thickness of for example 0.5 to 0.7 mm, preferably 0.6 mm, over its entire area in this exemplary embodiment.

In the modified embodiment according to FIG. 3, a support 2 is covered with a decorative layer which is composed of a plurality of decorative layer sections 7 and 7'. These decorative layer sections 7 and 7' have different thicknesses. Thus, there is provided a first decorative layer section 7 which covers or spans the entire airbag opening or the opening cover and the vicinity thereof. This decorative layer section 7 corresponds to the decorative layer 7 illustrated in FIGS. 1 and 2 and having the described features which bring about the advantages according to the invention. However, in the exemplary embodiment according to FIG. 3, this decorative layer section 7 is connected to further decorative layer sections 7', for example sewn via seams 10. However, these seams 10 are not tear-open lines but purely ornamental seams. The decorative layer sections 7' can then have a greater thickness of for example 1 mm or more. In the context of the invention, it is also possible to realize the embodiment illustrated in FIG. 3 with a single piece of leather, which then has a first, greater thickness in the region of the sections 7' and a second, smaller thickness in the section 7. The initially thicker leather is consequently split down to the required size only in the region 7. Details are not illustrated in the figures.

The invention claimed is:

1. A molded trim component for covering an airbag in a motor vehicle, comprising:
   a support which is weakened along an opening line adjoining an opening cover;
   an intermediate layer arranged on the support, the intermediate layer being weakened along a tear-open line; and
   a decorative layer made of leather arranged on the intermediate layer, the decorative layer having no local weakening in the region of the tear-open line in the intermediate layer;
   wherein the decorative layer is adhesively bonded over the surface of the intermediate layer at least in the region of the tear-open line in the intermediate layer or at least in the vicinity of the tear-open line, and wherein the tear-open line in the intermediate layer is positioned outward of the opening line from the opening cover.

2. The molded component as claimed in claim 1, wherein at least regions or sections of the tear-open line in the intermediate layer do not extend parallel to the opening line in the support.

3. The molded component as claimed in claim 2, wherein the tear-open line in the intermediate layer deviates in plan view from a square or rectangular form.

4. The molded component as claimed in claim 1, wherein the decorative layer has a thickness of 0.4 mm to 0.8.

5. The molded component as claimed in claim 1, wherein the leather has an elongation at break of up to 40%.

6. The molded component as claimed in claim 1, wherein the leather has a tear propagation strength of less than 12 N.

7. The molded component as claimed in claim 1, wherein a chrome-free tanned leather is used to produce the decorative layer.

8. The molded component as claimed in claim 1, wherein a vacuum-dried leather is used to produce the decorative layer.

9. The molded component as claimed in claim 1, wherein the intermediate layer is adhesively bonded over the surface of the support.

10. The molded component as claimed in claim 1, wherein the decorative layer is fastened to the intermediate layer by a reactivatable hot-melt adhesive.

11. The molded component as claimed in claim 1, wherein the intermediate layer is fastened to the support by a reactivatable hot-melt adhesive.

12. The molded component as claimed in claim 10, wherein the hot-melt adhesive is sprayed or rolled onto the decorative layer, the intermediate layer and/or the support.

13. The molded trim component as claimed in claim 1, wherein the decorative layer comprises a plurality of connected-together, decorative-layer sections made of leather having different thicknesses, wherein the thickness of the leather in the region of the opening cover is less than the thickness of the leather in the remaining regions.

14. The molded component as claimed in claim 3, wherein the tear-open line has an elliptical, oval, regionally elliptical or oval, or arcuate shape.

15. The molded component as claimed in claim 1, wherein the decorative layer has a thickness of 0.5 mm to 0.7 mm.

16. The molded component as claimed in claim 1, wherein the leather has an elongation to break of up to 35%.

17. The molded component as claimed in claim 1, wherein the leather has an elongation to break of between 25% and 40%.

18. The molded component as claimed in claim 1, wherein the leather has an elongation to break of between 30% and 35%.

19. The molded component as claimed in claim 1, wherein the leather has a tear propagation strength of less than 10 N.

\* \* \* \* \*